March 1, 1955   L. R. WRATHALL   2,703,368
PULSE REGENERATION
Filed Oct. 21, 1953   3 Sheets-Sheet 1

INVENTOR
L. R. WRATHALL
BY Harry C. Hart
ATTORNEY

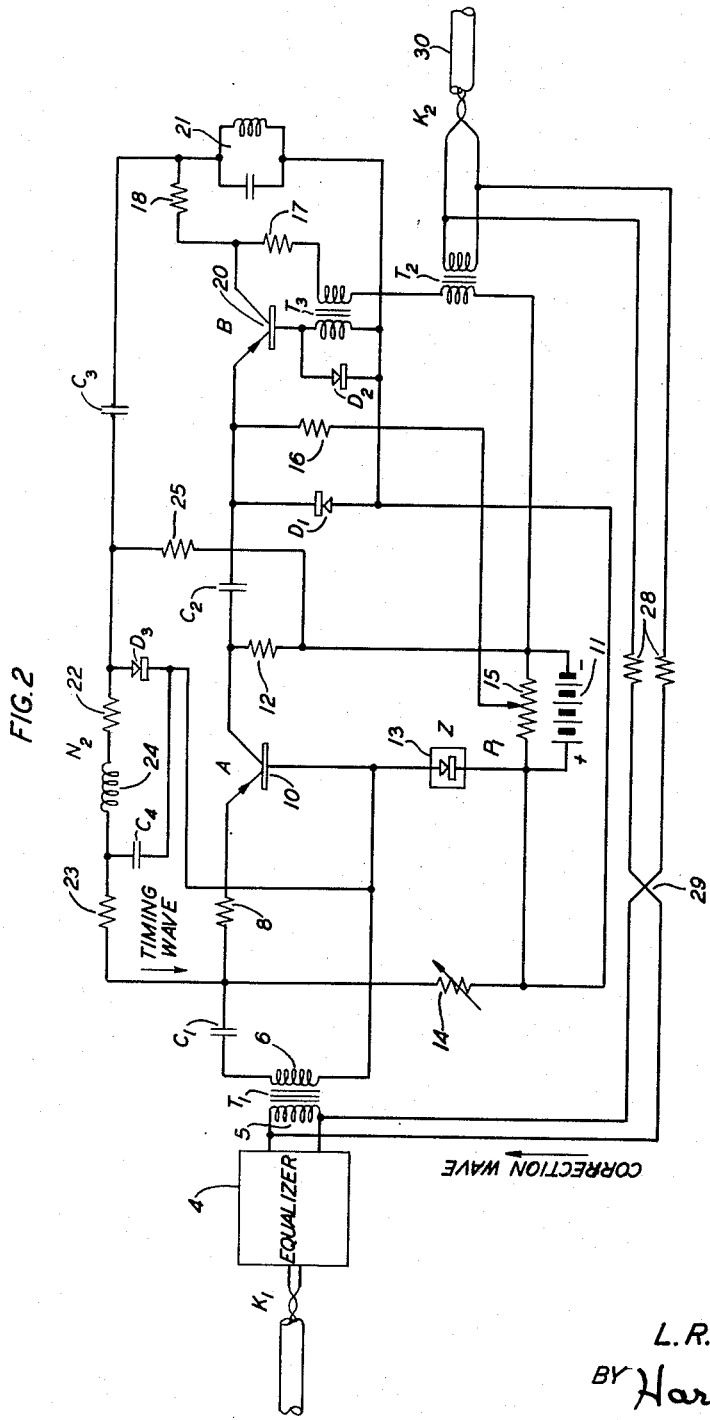

United States Patent Office 2,703,368
Patented Mar. 1, 1955

2,703,368

PULSE REGENERATION

Leishman R. Wrathall, Summit, N. J., assignor to Bell Telephone Laboratories, Incorporated, New York, N. Y., a corporation of New York Application October 21, 1953, Serial No. 387,501

18 Claims. (Cl. 307—106)

This invention relates to communication by pulse transmission and particularly to the full regeneration, both in amplitude and in time, of two-valued pulses which may have been distorted in the course of such transmission.

The generation of sharp pulses of standardized amplitudes at preassigned instants no longer presents a serious problem. In the course of transmission of such pulses over an ordinary transmission channel to a distant point, these sharp pulses become degraded in several respects. Their sharp corners become rounded by the high frequency attenuation characteristics of the transmission channel; their uniformity of amplitude is lost by reason of accretion of noise; and when the channel is one which cannot transmit direct current or the very low frequencies, a decay is introduced into the envelope of the pulse train which is sometimes termed a "wandering zero."

It is well known that, provided the degradation of pulse form due to the first two causes has not proceeded too far, each individual pulse may be completely restored to its original form or to any other desired standard form by regeneration which completely wipes out all accumulated noise and distortion. The principal element of pulse regeneration apparatus of a preferred type is a new pulse generator which is tripped or triggered by each incoming pulse, preferably as it passes through the signal level which corresponds to one-half of its nominal amplitude. But the presence of a zero wander in the incoming train may defeat the success of the regeneration process. In the course of a succession of pulses of the same kind, the envelope may well decay to such a point that the amplitudes of the last few pulses of the succession, measured from a constant reference level, are substantially less than one-half of the nominal pulse amplitude. When this occurs, the pulse is unable to trip the new pulse generator and the whole regeneration process fails. The accretion of a small amount of noise exaggerates these errors.

It is of course possible in principle to eliminate the zero wander, and so avoid the problems which it creates, by transmitting low frequencies all the way down to zero frequency or direct current. But only transmission channels of special types are able to carry these low frequencies and the interposition of a single transformer or unshunted series condenser puts a complete stop to the transmission of direct current and introduces a high attenuation to the very low frequencies. As a practical matter, it is in many cases desirable to include a series condenser or a transformer, or both, at at least one point in the channel and usually at many points. Transformers, for example, greatly facilitate impedance matching and provide convenient means for furnishing power for the operation of an unattended repeater station by phantom direct current circuits.

Accordingly, it is a principal object of the present invention to regenerate two-valued or binary pulses which have been transmitted by way of a channel which fails to pass currents of zero or low frequencies; i. e., by way of an alternating current channel. It is a particular object of the invention to regenerate pulses which have been transmitted through one or more transformers.

The apparatus of the invention attains these objects in part by balancing out the zero wander of the incoming train at the input point of each repeater of a series or at the input point of a terminal receiver. In accordance with a feature of the invention the wave which provides this balance comprises a train of pulses which are generated by the new pulse generator of the repeater and passed through the output element of the repeater, e. g., its output transformer which, like the others of the series, fails to pass the very low frequencies. The wave thus contains a decay which is similar to the decay of the incoming train. By appropriate control of its amplitudes and its phase and of the time constants of the system, the rate of decay of this locally generated wave may be caused to duplicate substantially exactly the decay rate of the incoming pulse train so that the decay balance is substantially perfect. At the same time, the feedback pulses are of a form which differs widely from the form of the incoming pulses, so that no significant pulse balance takes place. After such decay balance, the envelope of the resulting composite pulse train is free of zero wander but contains, for each incoming pulse, a steeply rising portion which can trip or trigger the new pulse generator with certainty.

To regenerate the pulses in time, the invention provides apparatus which is simple in construction and reliable in operation. In brief, each new pulse output of the new pulse generator is applied as a shock to excite a reactive circuit which is tuned to resonance at the pulse repetition rate. The wave thus generated is fed back to or close to the input point of the apparatus where it is combined with the incoming pulse train and the wander-correcting wave. The composite wave of these three components is characterized by a very sharp rise at the proper timing instants and each such rise actuates the new pulse generator. Second order deviations of the new pulses from their correct instants of occurrence are prevented in two ways. First, the timing wave, before being combined with the incoming wave, is adjusted by a circuit combination of a rectifier and a condenser to have its positive peaks always at a potential level of zero, its average value and its negative swings adjusting themselves accordingly. Second, amplitude variations within the resonant circuit which might take place due to a variation in the course of signal modulation of the number of ON pulses per second is prevented from causing a corresponding variation in the amplitude of the composite pulse at the point of the circuit at which this composite pulse acts to trip the new pulse generator. This prevention is achieved by applying to a blocking condenser, which receives a charge from one source which is proportional in part to the timing wave amplitude, a charge from another source which is directly proportional to the number of ON pulses per second in the incoming train.

The invention will be fully apprehended from the following detailed description of a preferred embodiment thereof taken in conjunction with the appended drawings in which:

Fig. 2 is a schematic circuit diagram showing a pulse repeater in accordance with the invention.

Figure 1:
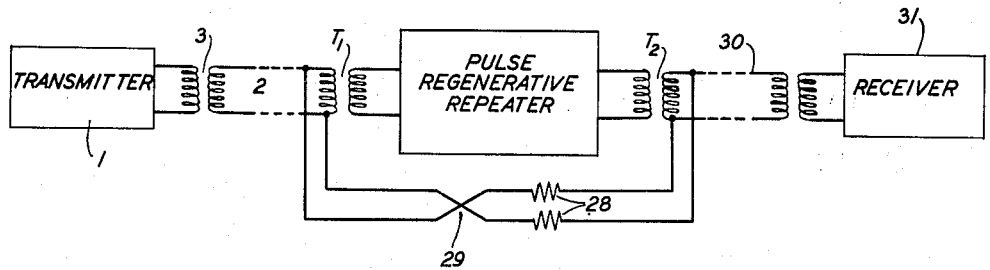
Fig. 1 is a block schematic diagram showing a pulse transmission system including a pulse regenerator in accordance with the invention.
Figure 3:
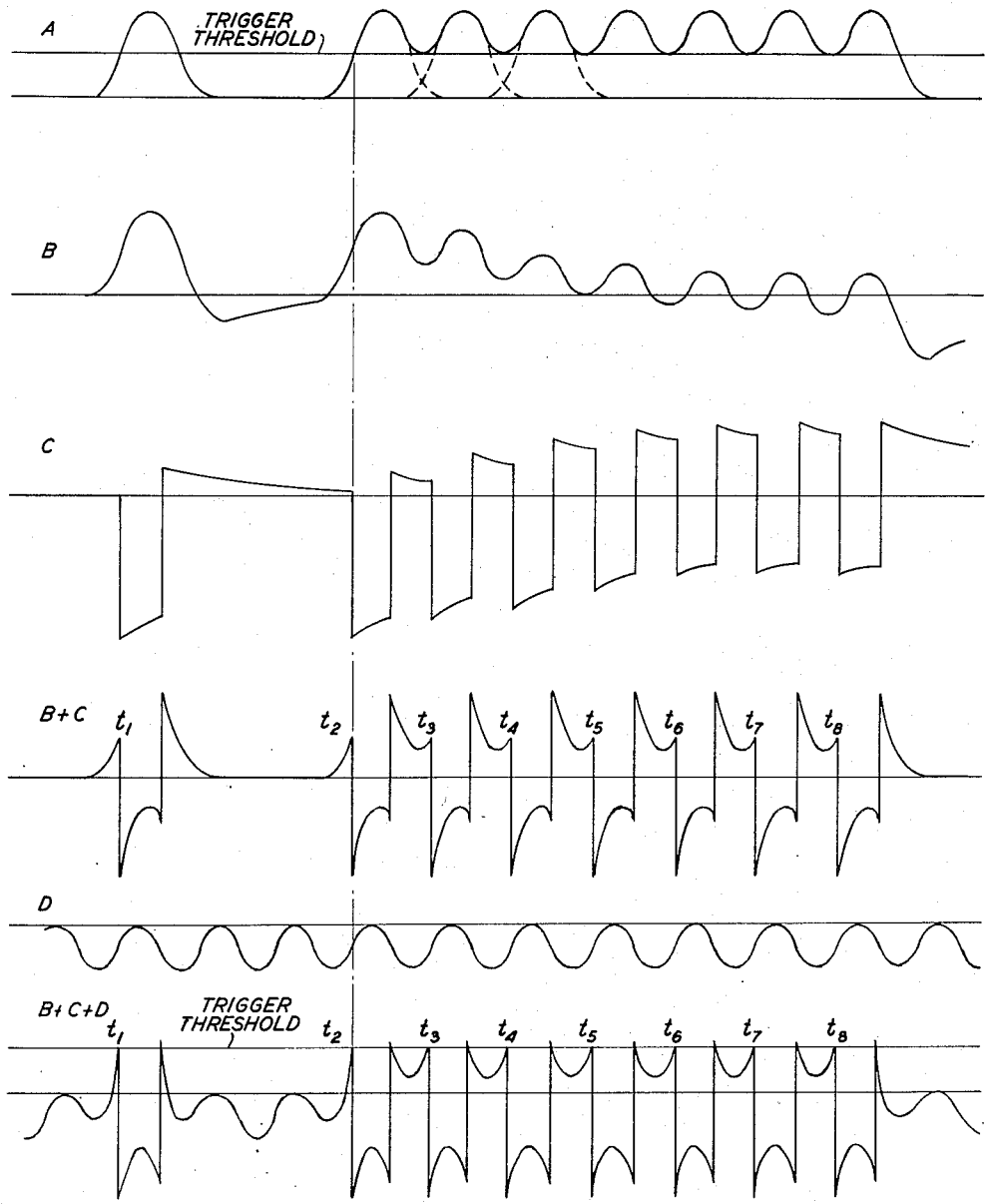

Referring now to the drawings, it may be assumed that transmitter apparatus 1 of Fig. 1, which is located at a distance from the pulse repeater station, generates sharp pulses of standardized amplitudes which occur or fail to occur, in dependence on their modulation, in preassigned regularly recurring time slots and that such pulses, after transmission over a channel 2 of substantial length and having a frequency characteristic of a common variety, would appear as shown in curve A of Fig. 3 provided the channel is capable of transmitting direct current and currents of very low frequencies. However, because of the employment, in the transmission apparatus or in the prior pulse repeater or a series of such repeaters, of an output transformer 3 which is unable to transmit these low frequencies, the pulses which actually reach the input terminals of the repeater of Fig. 1 are characterized by a sag, decay, or zero wander, as shown in curve B of Fig. 3.

Fig. 2 shows the repeater of Fig. 1 in full detail. In accordance with standard practice, an equalizer network 4 may be included to compensate at least in part for the high frequency transmission characteristics of the channel. It cannot, however, restore the low frequencies which were lost in transmission through the prior output transformer. The curve B may be regarded as showing the wave form of a representative pulse train after such partial correction by the equalizer.

The input terminals of the repeater proper are connected to the primary winding 5 of an input transformer $T_1$. Its secondary winding 6 is connected by way of a condenser $C_1$ and a resistor 8 to the base and emitter electrodes, respectively, of a point contact transistor 10 which is connected for service as an amplifier A of the grounded base configuration. Operating voltage is applied to the collector electrode of the transistor 10 from the negative terminal of a battery 11 and by way of a load resistor 12. Operating bias for the emitter is derived from a Zener diode rectifier 13 and applied by way of a resistor 14 and the resistor 8 to the emitter electrode. Zener diodes and their employment as bias sources especially for transistor electrodes are described in an application of W. Shockley, Serial No. 211,212, filed February 16, 1951.

The output of the amplifier A which appears across the resistor 12 is applied by way of a blocking condenser $C_2$ to the emitter of a second point contact transistor 20, connected for operation as a blocking oscillator B. Its base electrode is connected by way of the secondary winding of a transformer $T_3$ in parallel with a rectifier $D_2$ to the positive terminal of the battery 11. Operating bias for the emitter electrode, the magnitude of which determines the tripping threshold of the blocking oscillator B, is derived from a potentiometer 15 connected across the battery 11 and applied to the emitter through a resistor 16. Operating potential for the collector is derived from the negative terminal of the battery 11 and applied by way of the primary winding of an output transformer $T_2$, the primary winding of the transformer $T_2$ and a protective resistor 17 to the collector electrode. The windings of the transformer $T_3$ being closely coupled magnetically, the circuit of this transistor 20 is thus a blocking oscillator of the type described in an application of J. H. Felker, Serial No. 242,442, filed August 18, 1951. As explained in the Felker application, the negative bias of the emitter electrode with respect to its base electrode makes for monostable trigger action or single trip operation in which, each time it is tripped, it delivers a single positive-going output pulse, returning thereafter to a negative potential rest condition. Thus its output pulses are unbalanced, and any train of such pulses contains components of low frequencies, including a D.-C. component. The potential at which tripping takes place is determined by the setting of the potentiometer 15 at a suitable level with respect to the pulse peak as shown in curve A of Fig. 3.

The rectifier $D_2$ which is shunted across the primary winding of the transformer $T_3$ enters its low resistance condition whenever the voltage across it changes sign at the termination of the output pulse, and thus loads the primary winding of the transformer with a damping resistance in excess of the critical damping value. It serves to inhibit a second tripping of the blocking oscillator B immediately after each prior one. In the course of each pulse proper, it is of negligible effect because its resistance is high in the direction of the impressed voltage. A second diode rectifier $D_1$, poled in the opposite direction, is connected between the emitter electrode of the transistor 20 and that terminal of the rectifier $D_2$ which is farthest from the base electrode of the transistor 20. Its function and operation will be described below.

The signs of each of the foregoing biases are given for transistors of N-type conductivity. Substitution of a transistor of P-type conductivity for either or both of the transistors shown of course requires a reversal of sign of each bias for that transistor.

The pulse output of the blocking oscillator B is applied by way of an isolating resistor 18 to one terminal of a simple parallel resonant circuit 21 which is tuned to the basic pulse repetition rate for which the system is designed. The tuning is preferably moderately sharp; e. g., it may have a "Q" of about 100. Then, when a single sharp pulse is thus applied to it, the tuned circuit continues to ring for a large number of cycles of its self-oscillations, e. g., for more than twenty, before the resistances of associated circuit elements shall have reduced its amplitude to one half of its original amplitude. Thus the phasing of its successive oscillations is maintained with high precision.

A feedback path leads from the upper terminal of this tuned circuit through a condenser $C_3$, resistors 22, 23, and a coil 24 to the junction point of the input condenser $C_1$ with the protective resistor 8. A rectifier $D_3$ poled in the direction shown is connected to the base electrode of the transistor 10 and its anode is biased negatively by connection through a resistor 25 to the negative terminal of the battery 11. This last circuit subcombination constitutes a so-called "D.-C. restorer" which acts in well-known fashion to hold the average potential about which the tuned circuit oscillations take place at a level which varies in such a fashion that the positive oscillation peaks just reach zero potential as indicated by curve D of Fig. 3.

A condenser $C_4$ is connected in shunt with the coil 24, the resistor 22 and the rectifier $D_3$. This network serves to introduce into the feedback signal an adjustable phase shift by means of which the times of occurrence of the positive peaks of the feedback oscillations are brought into the most favorable relation with the times of occurrence of the incoming signal pulses; e. g., in time coincidence with their positive-going peaks, as illustrated in curves D and A of Fig. 3.

A second feedback path leads from the secondary winding of the output transformer $T_2$ and through a resistance pad 28 to the primary winding of the input transformer $T_1$. It is the function of this second path to feed to the input terminals of the apparatus a wave having a decay of the appropriate magnitude and slope to balance out and so eliminate, the decay of the incoming pulse train B of Fig. 3. This is accomplished in the following fashion.

Assume that an incoming pulse, after amplification by the amplifier A, has risen to the tripping potential level (curve A of Fig. 3) of the blocking oscillator B and that as a result this blocking oscillator has generated a single sharp pulse and applied it to the primary winding of the output transformer $T_2$. Such a pulse is shown inverted at the left of curve C of Fig. 3. The output pulse thus generated by the blocking oscillator passes through the output transformer $T_2$ and into the outgoing line 30 for transmission to the next repeater station of the series or to a terminal receiver. In so doing, its zero and low frequency components are suppressed. If a train of such output pulses should be generated in immediate succession, suppression of these low frequency components of all the pulses of the train would result in a gradual shift or decay of the envelope of its peaks, as shown in the right-hand part of the curve C. The same pulses, with their low frequency components suppressed, and so with the same envelope decay, are transmitted through the resistance pad 28 to the primary winding of the input transformer $T_1$ where they are combined with the pulses of the incoming train. Before such combination, however, they are reversed in polarity, e. g., by the crossed connections 29 of the feedback path, and are adjusted by proportionment of the resistors of the pad 28 to such an amplitude as gives the decaying component exactly the same magnitude and decay rate as that of the incoming train and so balances it out completely at the transformer input terminals, as indicated in the curve $B+C$ of Fig. 3.

Each individual pulse of the incoming train has a form determined by the characteristics of the transmission line as corrected, at least in part, by the equalizer 4. The forms shown in the curves of Fig. 3 are representative. Each pulse of the curve A of Fig. 3 has a form which is given approximately by a cosine wave which reaches a positive excursion of two units and whose negative excursions reach the zero potential level at instants which overlap the preceding and following pulse periods by about one quarter of a pulse period. As shown in the curve C of Fig. 3, the fed back pulses are of approximately rectangular form, each positive excursion occupying one half pulse period. Under this particular condition, both for the pulses of the incoming train and for those of the fed back train, the energy of each individual pulse of the one kind is made equal to that of a pulse of the other kind by adjustment of the amplitude of the feedback pulse to about 35 per cent in excess of the peak amplitude of the incoming pulse.

Combination of the pulses of the incoming train with the pulses thus fed back in phase opposition gives rise to a composite pulse train as shown in the curve $B+C$.

The decay which characterizes any pulse or train of pulses which has been transmitted through any circuit element whose transmission is small for low frequencies and zero for direct current follows an exponential law. A distinguishing feature of the exponential law is that two exponential curves characterized by the same exponent may be perfectly fitted together at any two different parts of the time scale, provided only that their initial amplitudes are readjusted to permit this fit. It is a feature of the present invention that this characteristic is turned to account. Any disturbance appearing at the input terminals of the apparatus, i. e., at the primary winding of the transformer $T_1$, requires a minute amount of time to reach the blocking oscillator B. More time elapses while this disturbance increases to a potential such that the blocking oscillator fires. Further delays are introduced by the blocking oscillator transformer $T_3$ and the output transformer $T_2$. Thus, the total time which elapses between the appearance of a disturbance at the primary winding of the input transformer $T_1$ and the return to the same point of the resulting translated disturbance by way of the feedback path may be a substantial fraction of a pulse period of the incoming train. But, because of the characteristic of the exponential law pointed out above, the decay of the fed back pulse train may still be made to balance out the decay of the incoming pulse train exactly, provided only that its amplitude be properly adjusted.

It is a further feature of the invention that, while the decaying component of the pulse train fed back is the one which is required for balance purposes, this decay is most simply derived, without the addition of any special apparatus, by application of the unbalanced outgoing pulses of the blocking oscillator B, which contain zero and low frequency components, to the output transformer $T_2$ which eliminates those components. The result is a wave which comprises a train of pulses superposed upon a decay wave, as shown in curve C of Fig. 3. The pulse train is required for transmission over the outgoing line 30 to the receiver station 31 and the decay wave is harmless on the outgoing line because it may be compensated in the next repeater or in the receiver in the fashion described above. On the other hand, from the standpoint of the compensation by way of the feedback path, it is the decay component which is required while the pulses themselves are harmless. The fact that they are harmless becomes clear upon reference to the curves of Fig. 3, and particularly the curve $B+C$, wherein it appears that while the wave actually applied to the input transformer is characterized by a highly complicated wave form, its magnitudes at the sampling instants $t_1$, $t_2$, $t_3$, etc., which are the only instants at which the blocking oscillator B may respond, have the same values as they would have if the negative pulse excursions of the feedback wave C had been eliminated, leaving only the required decay component of this wave for combination with the incoming pulse train. Combination of the pulses of the incoming train with the pulses thus fed back in phase opposition gives rise to a composite pulse train as shown in curve $B+C$.

The distortion correction apparatus as thus far described permits the full amplitude regeneration of binary pulses which have been transmitted over an A.-C. channel, i. e., one which has the properties of a band pass filter in that it attenuates both the very low frequencies and the very high frequencies, blocking zero frequency entirely. The apparatus thus permits the inclusion at will of elements that have such characteristics, namely series condensers and transformers, in the transmission channel, without effecting the result of the regeneration.

In accordance with a further feature of the invention, it regenerates degraded incoming pulses, not only in amplitude but in time as well. This is accomplished by way of a timing wave (curve D of Fig. 3) which, as described above, is derived from the tuned circuit 21 and adjusted in potential so that its positive swings reach from negative potentials which may vary up to a uniform potential of zero, is added to the composite wave $B+C$ at the junction point of the condenser $C_2$ and the resistor 8. The resulting composite wave, which now has three components, is shown in the curve $B+C+D$. While it has a very peculiar wave form, it has two preeminent features: first, it has no low frequency component or decay; and second, it rises very sharply to the tripping potential for which the blocking oscillator B is set at each of a succession of instants, $t_1$, $t_2$, $t_3$ and $t_4$, etc. At these instants, the composite voltage wave passes through the trigger threshold, whereupon the blocking oscillator B generates its output pulse, curve C, and the cycle repeats.

Figure 4:
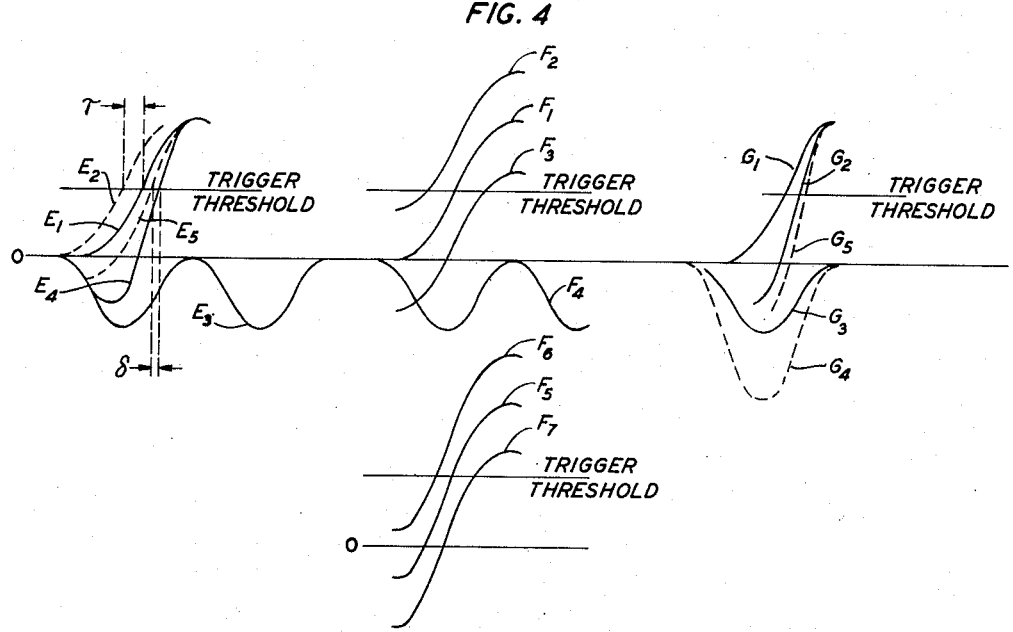
Figs. 3 and 4 show a number of wave form diagrams of assistance in explanation of the operations of the apparatus of Fig. 1.

The advantages in precision of timing which are secured by the combination of the timing wave, with its positive-going peaks adjusted to zero potential, curve D of Fig. 3, with the incoming signal in the foregoing fashion are illustrated in Fig. 4 for a single pulse and without inclusion of the distortion-correcting feedback pulse train, curve C of Fig. 3. Here the curve $E_1$ shows a portion of an incoming pulse while the curve $E_2$ shows the same incoming pulse displaced by a small time interval $\tau$ toward the left. If this incoming pulse alone were to trip the new pulse generator, the timing error would be equal to the interval $\tau$. The curve $E_3$ shows a part of the timing wave adjusted in phase so that one of its positive-going peaks coincides in time with the positive peak of the incoming pulse $E_1$. The curves $E_4$ and $E_5$ show, respectively, the sum of this timing wave, $E_3$, with the incoming pulses $E_1$ and $E_2$. Evidently the instants at which the combination waves $E_4$ and $E_5$ cross the tripping threshold are separated by an interval $\delta$ which is much less than the original interval $\tau$. Thus, the combination of the timing wave with the pulse of the incoming train in the fashion shown tends to desensitize the system to timing errors due to perturbations of the incoming pulses along the time scale.

The curve $F_1$ shows a portion of the same incoming pulse in its correct location on the amplitude scale while the curves $F_2$ and $F_3$ show the same portion of the same pulse displaced upward and downward, respectively, as they might be by reason of an accretion of noise in the course of transmission. The curve $F_4$ shows a portion of the timing wave and the curves $F_5$, $F_6$ and $F_7$ show corresponding portions of the wave which results from the additive combination of this timing wave with the pulses $F_1$, $F_2$ and $F_3$, respectively. Evidently again, the instants at which the combination waves cross the tripping threshold of the new pulse generator are spaced much less far apart on the time axis than are the corresponding instants of the original input waves $F_1$, $F_2$ and $F_3$. Thus, the combination of the timing wave with the input pulse in the fashion described above improves the precision of timing with respect to perturbations of the incoming pulse due to noise.

The system is also highly insensitive to variations in amplitude of the timing wave itself. The curve $G_1$ shows a portion of an incoming pulse and the curve $G_2$ shows the composite pulse resulting from the addition of the pulse $G_1$ with one half cycle of the timing wave $G_3$. If the amplitude of the timing wave itself were to be doubled, the positive-going peaks being maintained at zero potential, its negative-going half cycle would be as shown in curve $G_4$. The curve $G_5$ shows the combination of this timing wave $G_4$ with the incoming pulse $G_1$, and the displacement along the time axis between the instants at which the curves $G_2$ and $G_5$ cross the tripping threshold of the blocking oscillator B represents the very small residual timing error which results from a timing wave amplitude variation of as much as two to one.

As shown in the curves of Figs. 3 and 4, it is a significant feature of the present system that the timing waves are not employed to actuate a gate or sampler but, rather, are combined additively with the incoming waves for application to the blocking oscillator B. As a consequence, the phase of the oscillations of the tuned circuit, while comparatively stable over any short time or small number of cycles, is in the last analysis controlled by the pulse repetition rate of the incoming wave. It is this feature which permits the employment of a timing wave derived on a feedback basis with consequent simplification of apparatus as distinguished from a timing wave derived directly from the incoming train which requires by itself apparatus of substantial complexity.

The foregoing discussion has disregarded the effects of the blocking condenser $C_2$ which is employed to isolate the operating potential of the collector of the transistor 10 of the amplifier A from that of the emitter of the transistor 20 of the blocking oscillator B. Like the transformers of the system, this condenser $C_2$ is unable to pass zero or very low frequencies. Without more, this condenser would thus operate to nullify, at least in part, the action of the timing wave feedback circuit. For good high frequency transmission from the amplifier A to the blocking oscillator B, this condenser $C_2$ must be of large capacity and so determines a long time constant; in particular, a time constant which is much longer than that determined by the condenser $C_3$ of the D.-C. restorer circuit. As a result, while the D.-C. restorer acts to hold the positive peaks of the timing wave to a uniform potential on a pulse-to-pulse basis, a steady bias charge would accumulate slowly on the condenser $C_2$ on occasions when, due to a large unbroken sequence of positive pulses of the incoming train, the amplitude of the ringing oscillations of the tuned circuit 21 might increase. This slowly changing but nevertheless significant charge bias, if allowed to persist, would produce a harmful change in the trigger threshold of the blocking oscillator B. In accordance with a further feature of the invention, however, this slowly changing charge bias is compensated for each peak of the timing wave by a pulse of negative potential which is produced across the rectifier $D_1$ by the pulse of current which, each time the blocking oscillator fires, flows to the emitter electrode of the blocking oscillator transistor 20. This pulse is in the proper direction to charge the condenser $C_2$ in the opposite direction from that caused by an increase in the amplitude of the timing wave. Inasmuch as the timing wave amplitude increase is proportional to the number of shocks which the tuned circuit 21 receives per unit time and thus also proportional to the number of successive ON pulses in a subgroup of the incoming train, then by providing an equal and opposite auxiliary scavenger pulse through the rectifier $D_1$, the slow accumulation of charge on the condenser $C_2$ is prevented, and the timing operations proceed substantially perfectly and unaffected by the distribution of pulses in the incoming train.

What is claimed is:

1. In a system for communication by trains of "on" and "off" pulses having no direct current component and attenuated low frequency components, each said train being thereby characterized by a preassigned envelope decay, a repeater having a pulse generator which responds to incoming pulses and having an input point and an output element, means including said output element for introducing into each train of output pulses of said generator a decay wave of said preassigned rate, means for adjusting the amplitude of said decay wave to equality with the envelope decay of said incoming pulse train, and means for applying said adjusted decay wave in opposition to each said incoming pulse train.

2. Apparatus as defined in claim 1 wherein said output element comprises a transformer having a time constant equal to the envelope decay of said incoming pulse train.

3. Apparatus as defined in claim 2 wherein said applying means comprises a negative feedback path extending from the secondary winding of said transformer to said input point.

4. Apparatus as defined in claim 3 wherein said amplitude adjusting means comprises a reactanceless attenuator in said feedback path.

5. In a system for communication by trains of "on" and "off" pulses, a plurality of pulse repeaters spaced apart in tandem, each of said repeaters having a pulse generator which responds to incoming pulses and having an input point and an output element characterized by a preassigned time constant which introduces into each pulse train a decay at a preassigned rate, and means for applying the decay energy of said output element in opposition to incoming energy at said input point, whereby distortion introduced into an incoming pulse train by the output element of each repeater is compensated at the input point of the next repeater.

6. Apparatus as defined in claim 5 wherein said output element comprises a transformer having a time constant equal to the envelop decay of said incoming pulse train.

7. Apparatus as defined in claim 6 wherein said applying means comprises a negative feedback path extending from the secondary winding of said transformer to said input point.

8. Apparatus as defined in claim 7 wherein said amplitude adjusting means comprises a reactanceless attenuator in said feedback path.

9. In a system for communication by trains of "on" and "off" pulses, a plurality of pulse repeaters spaced apart in tandem, each of said repeaters having a pulse generator which responds to incoming pulses in excess of a preassigned threshold, and having an input point and an output element whose transmission is zero at zero frequency, and means for applying each output pulse of said pulse generator by way of said output element in opposition to incoming pulse at said input point, whereby distortion introduced into an incoming pulse train by the output element of each repeater is compensated at the input point of the next repeater.

10. Apparatus as defined in claim 9 wherein said output element comprises a transformer having a time constant equal to the envelope decay of said incoming pulse train.

11. Apparatus as defined in claim 10 wherein said applying means comprises a negative feedback path extending from the secondary winding of said transformer to said input point.

12. Apparatus as defined in claim 11 wherein said amplitude adjusting means comprises a reactanceless attenuator in said feedback path.

13. In combination with apparatus as defined in claim 9, means for adjusting the amplitude of each output pulse, before said opposed application, in relation to the amplitude of an input pulse and to the wave forms of the input pulse and the output pulse to a level such that the energies of said opposed pulses are alike.

14. In combination with apparatus for regenerating each pulse of an incoming train which includes an input point, an output point, and a pulse generator which responds by delivery of an output pulse to incoming pulses of amplitudes in excess of a preassigned threshold interposed between said input point and said output point, means for controlling the timing of the responses of said generator which comprises a feedback path extending from said output point to said input point, a resonant circuit in said path, tuned to the basic pulse repetition rate of said train, and adapted to oscillate freely in response to each pulse of said generator, means for bringing the peaks of said oscillations into substantial phase coincidence with the peaks of the pulses of said incoming train, and means for additively combining each input pulse with one of said oscillations at said input point.

15. In combination with apparatus as defined in claim 14, means for desensitizing said pulse generator to variations in the amplitude of said oscillations.

16. Apparatus as defined in claim 15 wherein said desensitizing means comprises automatic bias adjusting means coupled to said feedback path for holding to a uniform potential the peaks of the oscillations of said resonant circuit which are of one sign.

17. Apparatus as defined in claim 16 wherein said bias adjusting means comprises a series condenser and a rectifier shunting said condenser.

18. In combination with apparatus as defined in claim 16, an element interposed between said input point and said pulse generator, which element offers a high impedance to low frequency components of energy applied thereto and blocks the zero frequency component of such energy whereby variations in the amplitude of said bias-adjusted timing wave applied to said element are reflected in a decay of the timing wave energy which passes said element, said timing wave amplitude variations being substantially proportional to variations in the number of pulses per second included in said incoming train, means for compensating for the decay of said timing wave energy which comprises means for deriving from said pulse generator for each output pulse thereof an auxiliary output pulse, and means for applying said auxiliary output pulses to said element in opposition to said oscillations, thereby to nullify said decay.

No references cited.